(12) United States Patent
Nechvatal

(10) Patent No.: US 7,370,733 B2
(45) Date of Patent: May 13, 2008

(54) DISC BRAKE FRICTION COUPLE WEAR INDICATOR

(75) Inventor: Robert Nechvatal, Columbia Station, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 262 days.

(21) Appl. No.: 11/182,812

(22) Filed: Jul. 18, 2005

(65) Prior Publication Data

US 2007/0012525 A1    Jan. 18, 2007

(51) Int. Cl.
    *F16D 66/02* (2006.01)
(52) U.S. Cl. .................................. 188/1.11 W
(58) Field of Classification Search .......... 188/1.11 W, 188/1.11 R
    See application file for complete search history.

(56) References Cited

U.S. PATENT DOCUMENTS

| | | | |
|---|---|---|---|
| 3,945,471 A | * | 3/1976 | Shimizu ................. 188/1.11 R |
| 3,961,690 A | * | 6/1976 | Schanz et al. ......... 188/1.11 R |
| 4,356,897 A | * | 11/1982 | Urban ................... 188/1.11 W |
| 4,945,818 A | * | 8/1990 | Ware ..................... 188/1.11 W |
| 4,991,310 A | * | 2/1991 | Melia .................... 188/1.11 W |
| 5,035,303 A | * | 7/1991 | Sullivan ................ 188/1.11 W |
| 5,492,203 A | * | 2/1996 | Krampitz .............. 188/1.11 W |
| 5,535,854 A | * | 7/1996 | Prince ................... 188/1.11 R |
| 6,390,244 B1 | * | 5/2002 | Sitter ..................... 188/1.11 W |

FOREIGN PATENT DOCUMENTS

DE           3612166 A1 * 10/1987

* cited by examiner

*Primary Examiner*—Thomas Williams
(74) *Attorney, Agent, or Firm*—Crowell & Moring LLP

(57) ABSTRACT

A disc brake assembly wear indicator configured to be examined by physical contact, i.e. touch, as well as by eyesight to determine wear of the brake assembly friction couple. Physical markings are provided on the assembly carrier and caliper in locations selected so that the tactile-sensible markings are furthest away when the friction couple is new or unknown and adjacent each other when the friction couple wear is at the minimally acceptable level.

3 Claims, 2 Drawing Sheets

DISC BRAKE FRICTION COUPLE WEAR INDICATOR

BACKGROUND AND SUMMARY OF THE INVENTION

The present invention relates to a wear indicator for disc brakes and, in particular, to a wear indicator that can be examined by physical contact (i.e., touch) where space permits and by eyesight and which thus permits inspection with regard to both the brake pads and rotor (hereinafter collectively referred to as the friction couple).

Disc brake assemblies for vehicles such as passenger cars and trucks are of generally well known construction and typically include a caliper, brake pads, a rotor and related hardware. The caliper is mounted in a carrier for back and forth sliding motion so that inward motion of the caliper when acted upon fluidically (air or other fluid) by operation of the vehicle brake pedal pushes the associated brake or friction pad into the revolving rotor associated with the vehicle wheel to be braked. The brake pads are typically steel plates to which heat-resistant (e.g., organic or metal-particle filled) friction material is joined by riveting, bonding or the like. The rotors are typically made of cast iron. Conventional examples of disc brake assemblies and their components are shown in U.S. Pat. Nos. 4,446,948; 6,811,002; and 6,910,554. Air disk brakes of the type used in commercial vehicles are also currently marketed by Bendix Commercial Vehicle Systems and WABCO Vehicle Control Systems, the construction of which is well known to those of ordinary skill in this field. Other examples of an air brake assembly are described in U.S. Pat. Nos. 4,022,300; 4,094,388, and 6,230,851.

Safety and cost considerations dictate that the condition of vehicle disc brake friction couple be regularly monitored and readily ascertainable. The ability to visually observe a pad wear indicator in a cost effective way is often defeated by various vehicle suspension components in addition to the associated wheel and tire. In addition, attention has been focused on the past on observing the amount of pad wear but not the amount of rotor wear which is less evident and not usually as rapid as pad wear.

In the past, it has been known to employ is vehicle brake systems and other types of machinery as well as to employ systems for indicating a wear condition of brake components such as friction discs and pads. Mechanical or electronic wear sensors have been proposed in truck disc brake systems as described in U.S. Pat. Nos. 5,330,034 and 5,651,430. Vehicle friction couples have also been used in construction machinery as described in U.S. Pat. No. 6,460,659 which proposes a visual brake wear indicator on which the signal indicating excessive wear of the friction material is provided by a pin visible through a window or a signal light activated by a pressure switch. As above indicated, however, visual indicators are often impractical because of sight-line obstructions, and remote sensing introduces an undesirable complexity and cost to the inspection process.

Another currently employed approach is to use the caliper position against a marking on the caliper itself to determine the condition of the brake pads. Still another conventional technique has been to insert a metal pin through a rubber sleeve so that pad replacement and rotor inspection are indicated by the edge of the rubber sleeve becoming flush with the edge of the metal pin. Alternatively, the rubber sleeve could surround the metal pin such that inspection and/or replacement would be deemed necessary when the rubber sleeve curled around the metal pin to a specific location indicated on the sleeve. In any of these cases, however, visual inspection is required but may not be possible, thereby limiting the use of these approaches to certain disc brake environments.

Other examples of disc brake assembly wear indicators or monitoring systems of varying complexity can be found in U.S. Pat. Nos. 3,648,511; 4,356,897; 5,261,508; 5,848,672; 5,931,266; 6,237,723; 6,450,587; 6,691,835; and 6,891,468. These documents are illustrative of the state of the art to which the present invention pertains.

An object of the present invention is to provide a wear indicator that reliably, accurately, and easily allows an inspector to determine either visually or tactilely the amount of wear on the friction couple, not just the friction pads.

The present invention is based upon the recognition that a highly accurate tactile wear indicator that also permits visual inspection can be achieved through the simple expedient of providing markings on the carrier as well as the brake caliper. In operation, these markings are furthest apart when the friction couple is in a new (or unworn) condition and decrease in their distance from each other as the friction couple, not necessarily just the pads, wears by an amount equal to the total wear on the friction couple system.

One advantage of the present invention, therefore, is that it permits inspection by touch where visual observation is not possible.

Yet another advantage of the present invention is that it indicates wear of the friction couple as a whole. Thus, for example, the indicator of the present invention signals the amount of friction couple wear when the pads wear down to a minimum acceptable amount but rotor wear has not occurred (as is sometimes the case with the first set of pads) or where both pad and rotor wear have occurred in combination.

By providing a physical mark such as a raised portion or an indication that is also visually observable between the caliper and carrier castings, inspection of the friction couple wear is now easily achieved as long as there is sufficient space between the brake assembly and the associated wheel for access by an inspector's fingers as, for example, exists with a 24.5 inch wheel and wide-based single wheels.

A still further advantage of the present invention is that inspection time can be significantly reduced without sacrificing accuracy and thereby presenting a reduced operating cost opportunity to customers.

The wear indicator of the present invention further contemplates that visual inspection can be enhanced with chemical markings such as paint or with adhesive stickers. In lieu of raised portions or indentations on the casting, the marking can also be subsequently machined on or ground in the casting.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
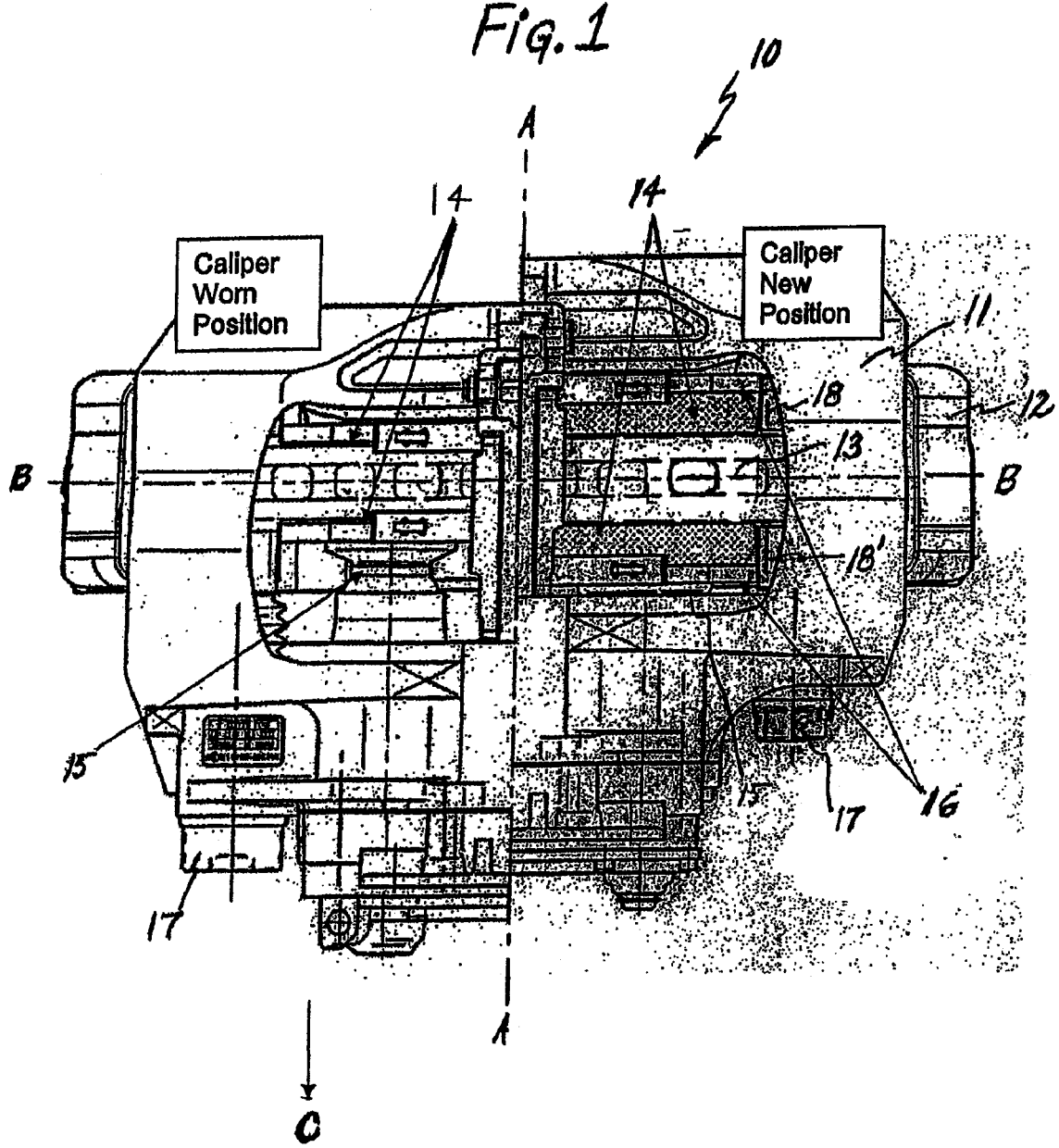
FIG. 1 is a split plan view of an air disc brake assembly showing the basic components therein in which the new condition of the assembly is shown on the right side of a centerline A-A (Caliper New Position) and the worn condition of the assembly is shown on the left-hand side (Caliper Worn Position)

Referring to FIG. 1, an air disc brake assembly of generally known configuration is designated generally by numeral 10. Inasmuch as the assembly is known to those in the art, details as to its overall structure and operation are omitted for sake of clarity except for those features and operations necessary for a full and complete understanding of the present invention and how it is used.

On the right-side of FIG. 1 (as well as on the left-side) the disc brake assembly 10 includes a caliper 11 and a carrier 12 for the assembly. As the right and left-hand sides of FIG. 1 are essentially a mirror image, reference numerals to denote the same parts are omitted except to show similar structure in the work condition.

The brake assembly friction couple is constituted by the rotor 13 and the brake pads 14 facing each side of the rotor. Tappets 15 are movably arranged inside the caliper housing in a generally known manner to extend inwardly toward the rotor 13 as wear occurs in order to maintain a desired rotor-to-pad spacing. The right side of FIG. 1 shows the tappet 15 in its fully withdrawn location and the left side shows another of the tappets 15 in its fully extended position.

As will be seen in FIG. 1, the carrier 12 and the rotor centerline B-B remain in the same location in both the new and worn conditions of the friction couple. During normal brake operations as wear occurs in the friction couple, the caliper 11 and its associated parts move in the directions of arrow C along slide pins 17 with movement of the tappets 15 in the opposite direction as described above. The aforementioned associated parts include, of course, the friction or brake pads 14 and the backplates 16 with which the caliper 11 makes contact in a braking operation to force the pads 14 into the rotor 13. The pads 14 are guided along the contact area of the carrier abutments 18, 18' on a known manner.

Figure 2:
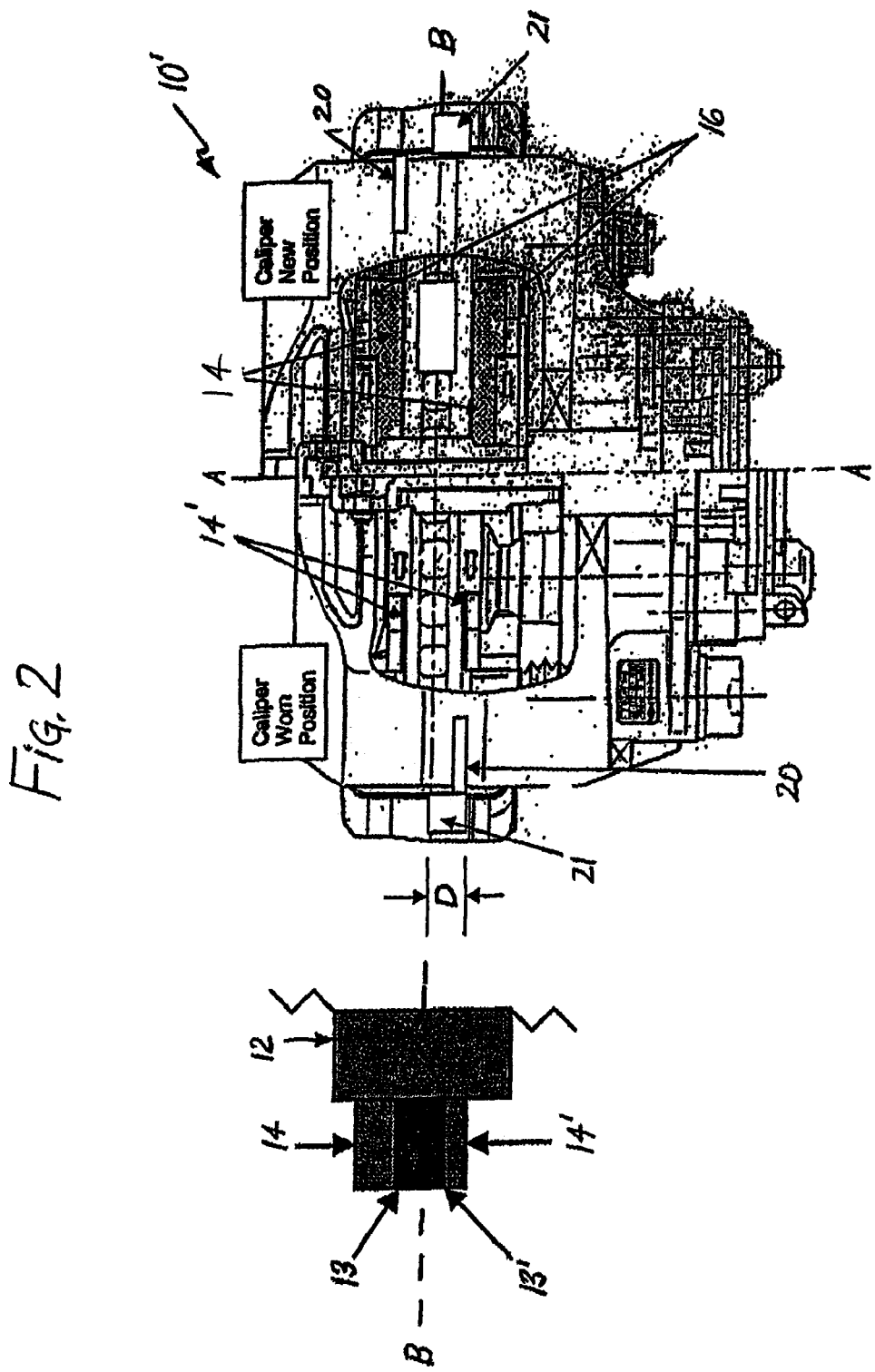
FIG. 2 is a view similar to FIG. 1 but showing the physical markings in accordance with the present invention and an isolated schematic of the friction couple wear between the new and the worn states.

Referring now to the left side of FIG. 2, the carrier 12, rotor 13 and pads 14 are shown schematically to show the new condition above the centerline B-B with the new pad/rotor condition shown above that centerline and the worn pad/rotor condition shown below that centerline. The disc brake assembly 10' shown on the left side of FIG. 2 is identical to the structure shown in FIG. 1 with the exception of the physical markings in accordance with the present invention as hereinafter described. Again, the new position of the friction coupling is shown on the right half of centerline A-A and the worn position is shown on the left half.

In the left side schematic of FIG. 2, the new rotor 13 and the worn rotor 13' are shown relative to the centerline B-B as are the new pad 14 and the worn pad 14'. In other words, the schematic shows a new friction couple and a fully worn friction couple. The distance D is the distance between the maximum rotor thickness and minimum rotor thickness.

On each side of the assembly 10', physical markings 20, 21 (e.g., a raised portion) are provided for a respective one of the brake pads 14 on opposite sides of the rotor. When the friction couple is in new condition (or unworn), as seen rightwardly of line A-A, the indicator marks 20, 21 are in their furthest apart position. Incidentally, the indicator mark 20 on the caliper 11 is shown with an exaggerated thickness for sake of clarity. In practice, the mark 20 will be a thinner line to make it easier to determine when maximum acceptable wear has occurred without misjudging the wear condition by looking at the upper part of the marking 20.

When the friction couple (pads and rotor) are worn to the minimum thickness D, the markings 20, 21 are aligned as shown on the left side of line A-A which in that case is for the friction couple formed by the rotor 13 and lower pad 14'. The markings 20, 21 are such that the inspector's finger can tell when the markings are aligned and pad and/or rotor replacement may be indicated. Instead of outward projections made at the time of casting the assembly carrier and calipers which reduces the already limited real estate around the rake assembly, indentations can be cast into the carriers and calipers to ensure a single line marking that will be permanently attached to the assembly. To allow for visual inspection as well, a paint can be applied to the markings or an adhesive label can be affixed thereto.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a brake assembly, the improvement comprising a wear indicator that is capable of being sensed tactilely, wherein the wear indicator includes at least one marking on a disc brake carrier and at least one corresponding marking on a disc brake caliper, wherein the indicator is comprised of raised regions on the disc brake carrier and the disc brake caliper.

2. In a brake assembly, the improvement comprising a wear indicator that is capable of being sensed tactilely, wherein the wear indicator includes at least one marking on a disc brake carrier and at least one corresponding marking on a disc brake caliper, wherein the wear indicator is comprised of recessed regions on the disc brake carrier and the disc brake caliper.

3. In a brake assembly, the improvement comprising a wear indicator that is capable of being sensed tactilely, wherein the wear indicator includes at least one marking on a disc brake carrier and at least one corresponding marking on a disc brake caliper, wherein the wear indicator is also configured to be visually inspected in lieu of tactile inspection to determine wear of components of the brake assembly, and wherein the wear indicator is chemically marked to provide visual inspection.

* * * * *